Dec. 18, 1962 W. F. PECK 3,068,745
SLIT LAMP APPARATUS
Filed May 17, 1960
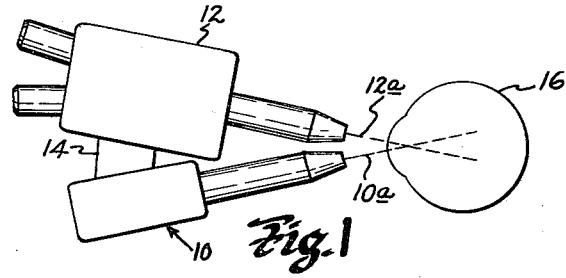
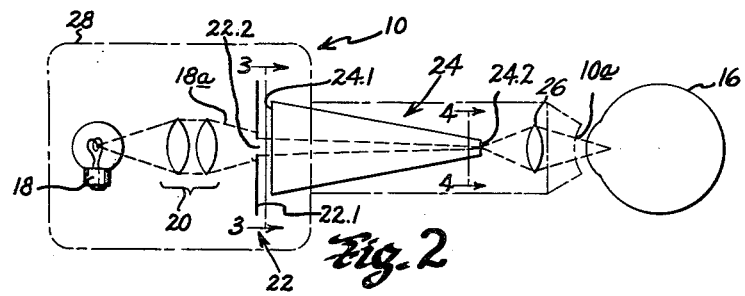
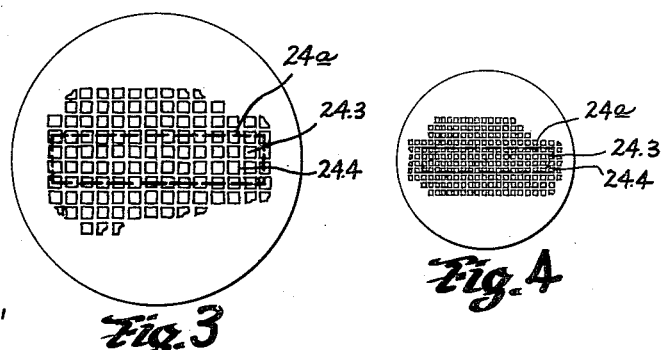
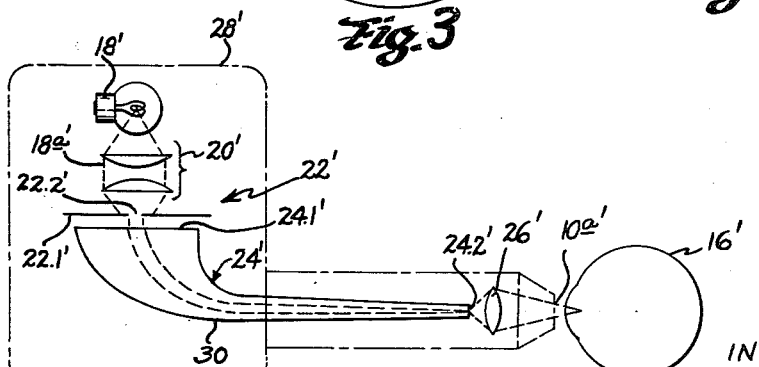
INVENTOR
WILLIAM F. PECK
BY
ATTORNEYS

United States Patent Office 3,068,745
Patented Dec. 18, 1962

3,068,745
SLIT LAMP APPARATUS
William F. Peck, Sturbridge, Mass., assignor to American Optical Company, Southbridge, Mass., a Massachusetts voluntary association
Filed May 17, 1960, Ser. No. 29,653
3 Claims. (Cl. 88—20)

The field of this invention is that of slit-lamps such as might be used in spectroscopic or ophthalmic instruments, and the invention relates more particularly to a novel and improved slit-lamp to be used in conjunction with a microscope for examination of the eye.

Slit-lamp microscopy utilized in the examination of the eye requires the provision of a wide but thin beam of light of selected size having an extremely well-defined edge, the beam of light being directed upon the eye as the eye is microscopically examined for illuminating layers of the eye structure in or adjacent to the anterior chamber of the eye. Slit-lamp apparatus presently used for this purpose incorporates mechanical means for forming a slit through which a beam of light is transmitted, in combination with lens means for projecting an image of the slit upon an eye. However, in order for such an apparatus to provide a beam of light which is sufficiently thin, the lens means incorporated therein must be adapted to accomplish substantial reduction in the size of the projected aperture image or the mechanical slit-forming means must be adapted to define an extremely small slit. As will be readily understood, reduction of the projected aperture image by a lens system results in some loss of image edge definition due to lens aberrations, whereas formation of an extremely small slit by mechanical means introduces imperfections in slit configuration imposed by reasonable limitations of mechanical tolerances.

It is an object of this invention to provide a slit-lamp apparatus which is adapted to project a wide but thin beam of light having a well-defined edge; and to provide such an apparatus which is adapted to form such a beam of light of adjustable size.

It is a further object of this invention to provide a slit-lamp apparatus which is adapted to furnish a wide but thin beam of light having a well-defined edge and which is adapted for convenient positioning relative to an eye to be examined microscopically; to provide such an apparatus which is of simple construction; to provide such an apparatus which is compact and of small size for convenient mounting in conjunction with a microscope to permit projection of a thin beam of light upon an eye at small angular inclination to the line of sight of the microscope; to provide such an apparatus which can be conveniently adjusted to project a thin beam of light upon an eye at substantially any desired angular inclination relative to the line of sight of a microscope mounted in conjunction therewith; to provide such an apparatus which can direct a wide but thin beam of light in various directions relative to the source of said light beam; and to provide such an apparatus which can be inexpensively manufactured.

An additional object of this invention is to provide a slit-lamp apparatus incorporating objective lens means for projecting a beam of light, means directing light toward the lens means, light stop means having a slit-shaped aperture interposed between the light-directing means and the lens means for defining a wide but thin light pattern, and fiber optical means interposed between the light stop means and the lens means for imaging the slit-shaped light pattern at reduced size in the focal plane of the lens means, thereby to permit projection of a wide but thin beam of light having well-defined edges by said lens means.

Other objects, advantages and details of construction of the apparatus provided by this invention will appear in the following detailed description of preferred embodiments of the invention, the description referring to the drawings in which:

FIG. 1 is a diagrammatic view of a slit-lamp microscope;

FIG. 2 is a diagrammatic view of a slit-lamp according to this invention adapted for use in the apparatus shown in FIG. 1;

FIG. 3 is a section view along line 3—3 of FIG. 2;

FIG. 4 is an enlarged section view along line 4—4 of FIG. 2; and

FIG. 5 is a diagrammatic view similar to FIG. 2 showing an alternative embodiment of this invention.

Referring to the drawing, 10 in FIG. 1 indicates a slit lamp apparatus mounted in a conventional combination with a suitably high-powered microscope 12 of any desired type upon a stand 14 for cooperation in the examination of an eye as indicated at 16. The slit lamp is adapted to direct a wide but thin beam of light, as at 10a, upon the eye obliquely relative to the line of sight, as at 12a, of the microscope. In the customary application of this arrangement, the stand is positioned relative to the eye by means not shown, and the slit-lamp and microscope components of the apparatus are adapted for movement upon the stand, also by means not shown, to permit microscopic examination of various layers of eye structure in or adjacent to the anterior chamber of the eye as illuminated by the light beam 10a. It will be readily understood by those skilled in the art of slit-lamp microscopy that the beam of light must have a smooth well-defined edge so that illuminated layers of eye structure can be clearly distinguished from unilluminated layers, whereby, for example, abnormalities or distortions of adjoining layer surfaces can be readily detected whereby the nature and configuration of such abnormalities can be clearly discerned and whereby depth of the line between illuminated and unilluminated portions of the eye can be conveniently and accurately determined.

According to this invention, as shown in FIG. 2, the slit-lamp apparatus 10 includes a light source 18 of any conventional type, preferably a filament lamp adapted to emit a relatively intense white light, combined with a suitable optical system such as the illustrated two-component lens condenser system 20 for directing a beam of light 18a emitted from the source through the apparatus. The apparatus further includes a variable slit mechanism 22 of any conventional type having a light stop or masking portion 22.1 and a slit-shaped light aperture 22.2, the mechanism being interposed in the light beam 18a so that the light beam is directed upon the light stop at the location of the light aperture in the conventional manner of light condenser systems thereby to define a wide but thin light pattern. The slit mechanism preferably has a pair of cooperable, knife-edge jaws mounted for travel toward and away from each other to form a slit-shaped aperture of a size selected from a wide range, and, most advantageously, the variable slot mechanism is adapted to be adjusted with a high degree of accuracy whereby the slit formed by the mechanism can be of accurate predetermined configuration and can have relatively well-defined, parallel, straight and smooth edges. Such a slit mechanism is more completely described in United States Patent No. 2,582,410 issued to the assignee of the invention herein disclosed on January 15, 1952, but it should be understood that any other relatively precise slit mechanism could be utilized within the scope of this invention. It should also be understood that any light source and optical system or any other means for directing a suitable amount of light upon the light stop aperture 22.2 is within the scope of this invention.

The apparatus also incorporates a tapered fiber optical device 24 having an end 24.1 of relatively large cross-sectional area and an end 24.2 of relatively small cross-sectional area, the device embodying a multiplicity of tapered light-conducting fibers 24.3 each of which initially has a light-insulating coating not shown. The fibers are assembled in side-by-side bundled relation with the large ends of each fiber at that end of the device having the large cross-sectional area, and preferably the fiber coatings are fused together as at 24.4 in FIG. 3 for integrating the fibers into a single unit. As shown in FIGS. 3 and 4, the fibers are initially square in transverse section but may assume a slightly different shape when fused to form the fiber bundle. The fibers are each adapted to conduct light from one end to the other of the fiber bundle forming the device 24, and the fibers are carefully aligned so that each fiber occupies the same relative position within the bundle at each end of the device, whereby a light pattern projected upon the large end of the device, as shown in FIG. 3 for example, can be received within those fibers upon which the light impinges and can be conducted through said fibers to image the same pattern at reduced size upon the other end of the device. However, as shown by comparison of FIGS. 3 and 4, light impinging upon any part of a fiber at the large end of the fiber device is imaged at the smaller end of the device over the entire fiber end. It can be seen that even where, as shown in FIG. 3, the light pattern directed upon large end of the fiber device only partially covers a row of fibers, the image of the pattern projected at the small end of the device will have well-defined edges. Preferably, the fibers are formed of glass material such as flint glass having a relatively high index of refraction and the fiber coatings are formed of a glass such as crown glass having a relatively low index of refraction, but the fibers and coatings can be formed of other materials, such as various plastics having corresponding characteristics, within the scope of this invention. Further details as to the construction of the fiber optical device 24 appear in United States Patent No. 2,825,260, issued to B. O'Brien on March 4, 1958, and in application Serial No. 669,883, now Patent No. 2,992,516, assigned to the assignee of the invention herein disclosed.

As shown in FIG. 2, the fiber optical device 24 is aligned with the slit mechanism 22 with the large end of the device disposed to receive light through the light aperture 22.2 thereby to image the aperture pattern at reduced size at the opposite end 24.2 of the device.

As shown in FIG. 4, the fibers as assembled in the device 24 are adapted to form an image, indicated therein by the broken line 24a, whose degree of edge definition is determined by the size and alignment of the fibers, and it can be seen that, where fiber thickness at the small end of the fiber device is on the order of 5 microns, image edge definition achieved by these means will be very high.

It should be understood that although square fibers are here illustrated, round fibers or fibers of other cross-sectional configuration could be utilized within the scope of this invention. Further, the coated fibers could be integrated by means other than fusing of the fiber coatings, for example, by use of an epoxy resin adhesive. The fiber device is here shown to be spaced slightly from the light aperture 22.2 for convenience of illustration, but preferably the device is mounted against the movable jaws of the slit mechanism 22, whereby the slit-shaped aperture will be more perfectly imaged upon the device end 24.1.

According to this invention, an objective lens means 26, preferably of low power, is arranged within the apparatus 10 for projecting the slit or aperture image appearing at the small end of the fiber device upon the eye 16. Since the image of the aperture 222 has been reduced by means of the fiber device 24 without substantial loss of edge definition, imperfections in aperture configuration resulting from mechanical deficiencies of the slit mechanism are reduced to insignificance and, as the objective lens means 26 can be of low power, the lens can have a relatively long focal length and can accomplish projection of the aperture image upon the eye 16 with substantial depth of focus and without substantial loss of image edge definition.

The slit-lamp apparatus 10 can be mounted in a casing, indicated by the broken line 28, in any suitable manner, and, if desired, the various components such as the lens means 26 can be adjustably mounted in any conventional manner for assuring proper alignment of the components. In addition, since the fiber device 24 is adapted to conduct light with high efficiency, the relatively cumbersome light-directing means, such as the lamp 18 and the lens means 20 and the slit mechanism 22 can be mounted a considerable distance from an eye to be examined but the fiber device will serve to conduct the thin beam of light 10a to a point close to the subject eye. This construction facilitates examination of the eye and to a certain extent spaces the heat-radiating portions of the apparatus adjacent the light source 18 away from the subject eye. Further, since the fiber means 24 can be of relatively compact construction for effecting demagnification of the light stop aperture image, the slit-apparatus can be manufactured in compact form so that when mounted in conjunction with the microscope 12, the slit apparatus can direct a thin beam of light 10a upon the eye 16 at a very small angular inclination to the line of sight 12a of the microscope.

As shown in FIG. 5, wherein apparatus components similar to those illustrated in FIG. 2 are identified by correspondingly primed numbers, the fiber device 24' can be bent where desired, as at 30, to permit convenient mounting of the apparatus components for facilitating examination of the eye. Thus, as shown, the fiber device 24' is adapted to transmit the image of the aperture 22.2' into the focal plane of the lens means 26' even though the path of the light beam directed upon the light stop aperture 22.2' is projected by the lens means with a different directional orientation. The fiber device can be adapted to be flexible adjacent the smaller end of the device 24.2' for facilitating adjustment of the slit lamp apparatus to direct a beam of light upon an eye at any desired angular inclination relative to a microscope mounted in conjunction therewith.

Although particular embodiments of this invention have been described for the purpose of illustration, it should be understood that this invention includes all modifications and equivalents thereof which fall within the scope of the appended claims.

Having described my invention, I claim:

1. A slit lamp apparatus comprising light stop means defining a relatively large slit-shaped aperture, means directing light through said aperture, a tapered fiber optical image-transfer device embodying a plurality of tapered light-conducting fibers each having a core of light-transmitting material of relatively high index of refraction and a cladding of a light-transmitting material of relatively low index of refraction, said fibers each having a large end and a small end and being secured together in side-by-side bundled relation so that the corresponding opposite ends of the fibers are arranged in the same geometrical patterns and cooperate to define respective large and small image faces, said fiber optical device being positioned with its large face adjacent said light-stop aperture for receiving light directed through said aperture and for reproducing a demagnified image of said aperture in the form of a long and narrow slit of light having sharply defined edges on the small face of said device, and lens means having one of its conjugate focal planes substantially coincident with the small ends of said fibers for focusing said slit of light in a given image plane while retaining said sharply defined edges.

2. Slit lamp apparatus comprising a light source, a light stop having adjustable means for forming a slit-shaped aperture of a selected relatively large size, optical means directing light from said source through said light stop aperture, a tapered fiber optical device embodying a plurality of tapered light-conducting fibers each having a core of light-transmitting material of relatively high index of refraction and a cladding of a light-transmitting material of relatively low index of refraction, said fibers each having a large end and a small end and being secured in side-by-side bundled relation so that the corresponding opposite ends of the fibers are arranged in the same geometrical patterns and cooperate to define respective large and small image faces, said fiber optical device being positioned with its large face adjacent said light-stop aperture for receiving light directed through said aperture and for reproducing a demagnified image of said aperture in the form of a long and narrow slit of light having sharply defined edges on the small face of said device, and objective lens means having one of its conjugate focal planes substantially coincident with the small ends of said fibers for focusing said slit of light in a given image plane while retaining said sharply defined edges.

3. Slit lamp apparatus as set forth in claim 2 wherein said tapered fiber optical device is curved intermediate its ends.

References Cited in the file of this patent

UNITED STATES PATENTS

| | | |
|---|---|---|
| 1,751,584 | Hansell | Mar. 25, 1930 |
| 1,806,318 | Tillyer | May 19, 1931 |
| 2,184,816 | Ross | Dec. 26, 1939 |
| 2,582,410 | Bergmann | Jan. 15, 1952 |
| 2,825,260 | O'Brien | Mar. 4, 1958 |

FOREIGN PATENTS

| | | |
|---|---|---|
| 282,187 | Great Britain | Dec. 22, 1927 |
| 896,063 | France | Apr. 17, 1944 |